(12) United States Patent
Azuma et al.

(10) Patent No.: US 7,660,443 B2
(45) Date of Patent: Feb. 9, 2010

(54) ARTIFICIAL EYE DISTINGUISHING METHOD AND DEVICE, ARTIFICIAL EYE DISTINGUISHING PROGRAM, IRIS RECOGNITION METHOD, FALSE PRINTED MATTER DISTINGUISHING METHOD, AND IMAGE DISTINGUISHING METHOD

(75) Inventors: Takeo Azuma, Kyoto (JP); Kenji Kondo, Kyoto (JP); Masahiro Iwasaki, Nara (JP); Masahiro Wakamori, Kanagawa (JP)

(73) Assignee: Panasonic Corporation, Osaka (JP)

( * ) Notice: Subject to any disclaimer, the term of this patent is extended or adjusted under 35 U.S.C. 154(b) by 521 days.

(21) Appl. No.: 10/529,316

(22) PCT Filed: Apr. 28, 2004

(86) PCT No.: PCT/JP2004/006224
§ 371 (c)(1),
(2), (4) Date: Mar. 25, 2005

(87) PCT Pub. No.: WO2004/097743
PCT Pub. Date: Nov. 11, 2004

(65) Prior Publication Data
US 2005/0286747 A1    Dec. 29, 2005

(30) Foreign Application Priority Data
Apr. 28, 2003   (JP) ............................. 2003-123204

(51) Int. Cl.
*G06K 9/00* (2006.01)

(52) U.S. Cl. ....................................... 382/117; 382/112
(58) Field of Classification Search .................. 382/117
See application file for complete search history.

(56) References Cited

U.S. PATENT DOCUMENTS

| | | | | |
|---|---|---|---|---|
| 4,641,349 A | * | 2/1987 | Flom et al. | 382/117 |
| 5,291,560 A | * | 3/1994 | Daugman | 382/117 |
| 6,081,607 A | * | 6/2000 | Mori et al. | 382/110 |
| 6,104,812 A | * | 8/2000 | Koltai et al. | 380/51 |
| 6,138,185 A | | 10/2000 | Nelson et al. | |
| 6,205,233 B1 | * | 3/2001 | Morley et al. | 382/103 |
| 6,247,813 B1 | * | 6/2001 | Kim et al. | 351/206 |

(Continued)

FOREIGN PATENT DOCUMENTS

JP    4-282776 A    10/1992

(Continued)

OTHER PUBLICATIONS

"A Modified Algorithm of Removing Grain Noises", Xianfeng, Journal of Harbin Engineering Unversity, vol. 18, Feb. 1997.

*Primary Examiner*—Bhavesh M Mehta
*Assistant Examiner*—David P Rashid
(74) *Attorney, Agent, or Firm*—Harness, Dickey & Pierce, P.L.C.

(57) ABSTRACT

Image data of an image including an eye is input (S1), and band limitation is performed (S2). Then, a predetermined feature such as moment is extracted from the band-limited image data (S3), and recognition as to whether the eye projected in the image is a counterfeit eye or a living eye is performed based on the extracted feature (S4).

16 Claims, 11 Drawing Sheets

U.S. PATENT DOCUMENTS

| | | | |
|---|---|---|---|
| 6,332,193 B1 * | 12/2001 | Glass et al. | 713/170 |
| 6,377,699 B1 * | 4/2002 | Musgrave et al. | 382/117 |
| 6,542,624 B1 * | 4/2003 | Oda | 382/117 |
| 6,549,118 B1 * | 4/2003 | Seal et al. | 340/5.82 |
| 6,760,467 B1 * | 7/2004 | Min et al. | 382/117 |
| 6,785,406 B1 * | 8/2004 | Kamada | 382/117 |
| 2002/0107801 A1 * | 8/2002 | Jones et al. | 705/45 |
| 2002/0136435 A1 * | 9/2002 | Prokoski | 382/118 |
| 2003/0012413 A1 | 1/2003 | Kusakari et al. | |
| 2003/0156733 A1 * | 8/2003 | Zeller et al. | 382/100 |
| 2004/0049401 A1 * | 3/2004 | Carr et al. | 705/1 |

FOREIGN PATENT DOCUMENTS

| | | |
|---|---|---|
| JP | 6-62233 A | 3/1994 |
| JP | 6-62241 A | 3/1994 |
| JP | 7-121722 A | 5/1995 |
| JP | 11-244261 A | 9/1999 |
| JP | 2000-033080 A | 2/2000 |
| JP | 2000-76514 A | 3/2000 |
| JP | 2000-185031 | 7/2000 |
| JP | 2000-298727 A | 10/2000 |
| JP | 3312303 | 5/2002 |
| JP | 3315648 | 6/2002 |
| JP | 2002-529981 A | 9/2002 |
| JP | 2003-30659 A | 1/2003 |

* cited by examiner

Living eye image

Counterfeit eye image (paper-type 1)

Counterfeit eye image (paper-type 2)

Band-pass filtered output of counterfeit eye image
(paper-type 2)

Band-pass filtered output of living eye image

Band-pass filtered output of counterfeit eye image
(paper-type 1)

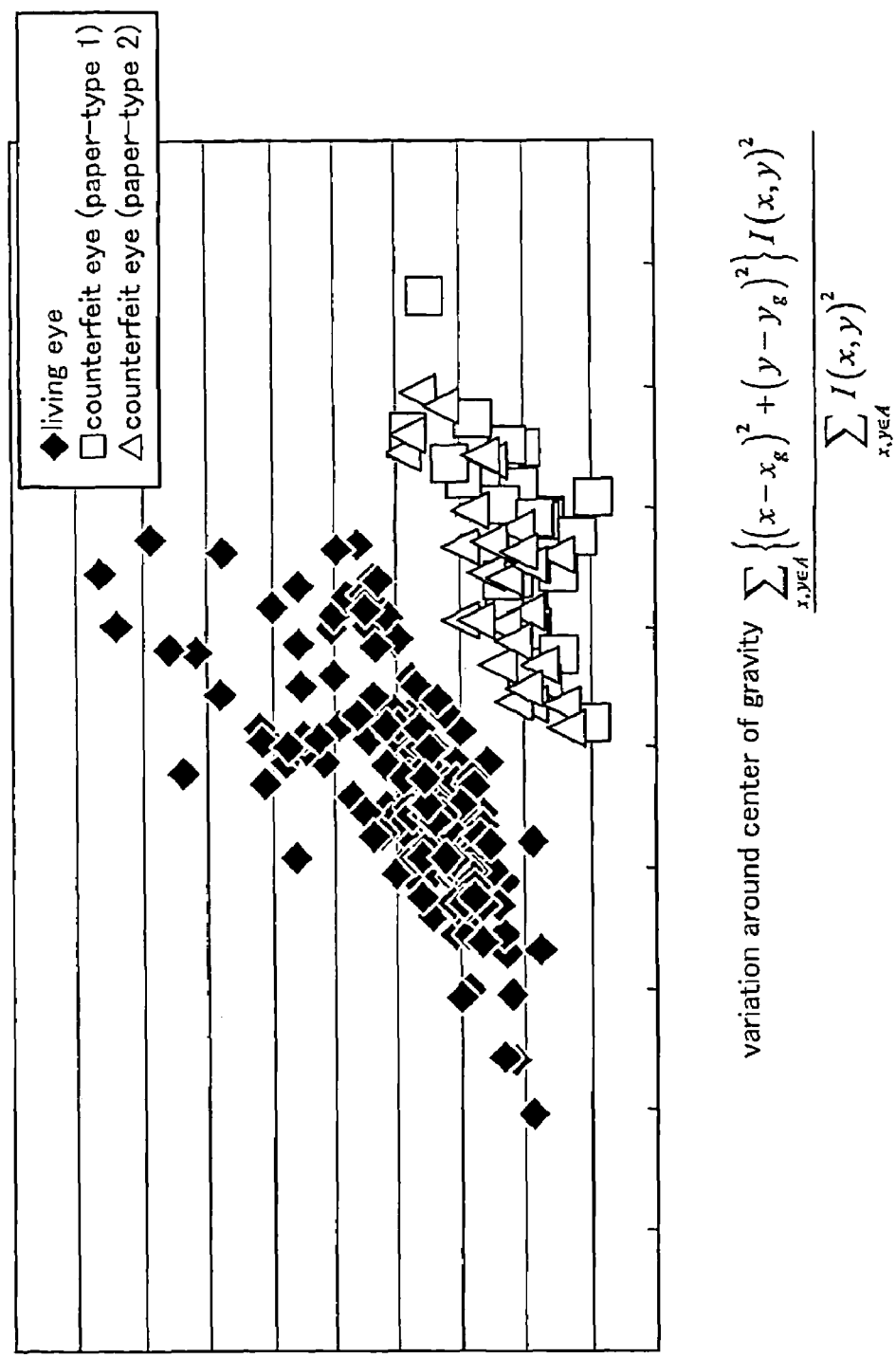

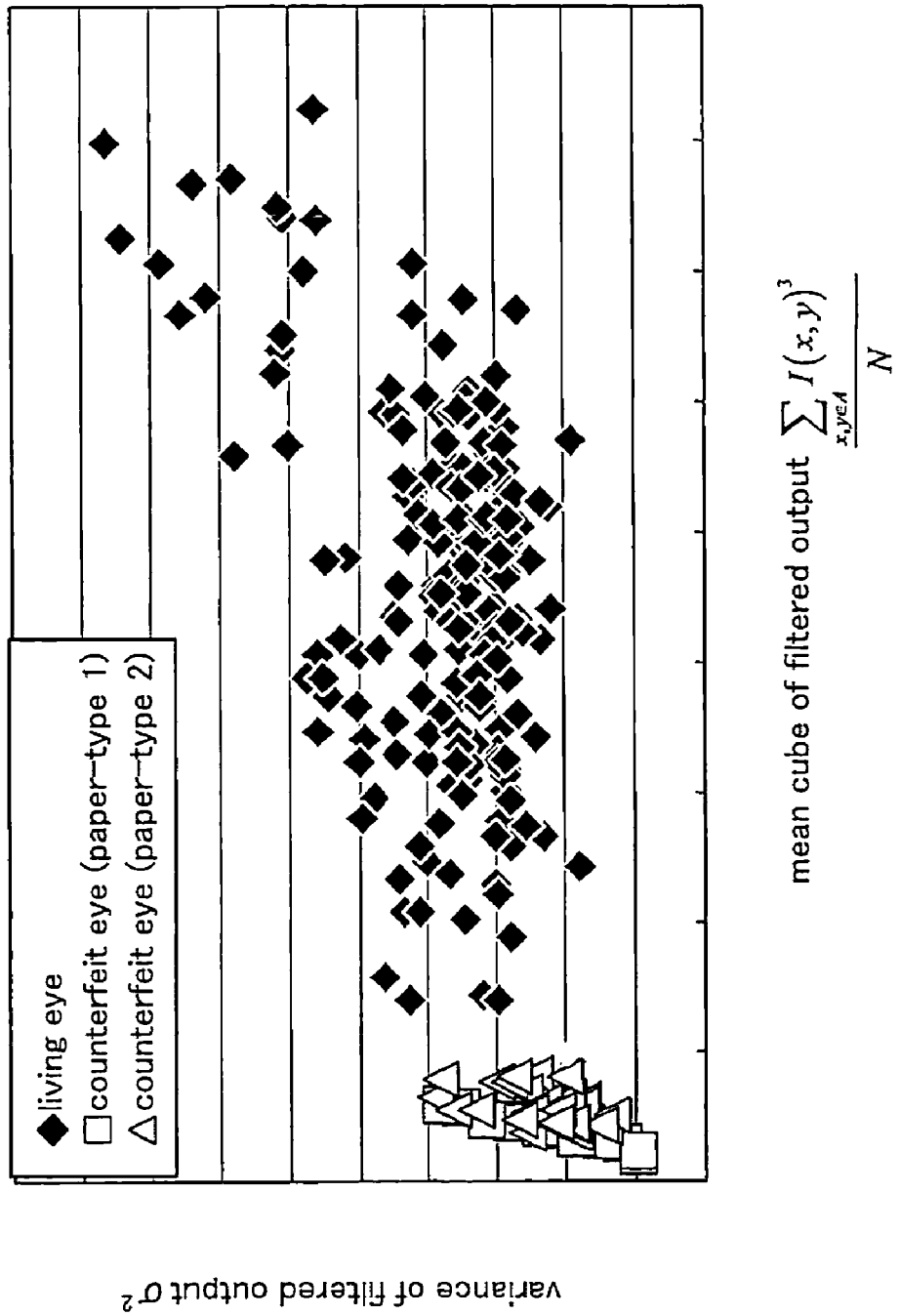

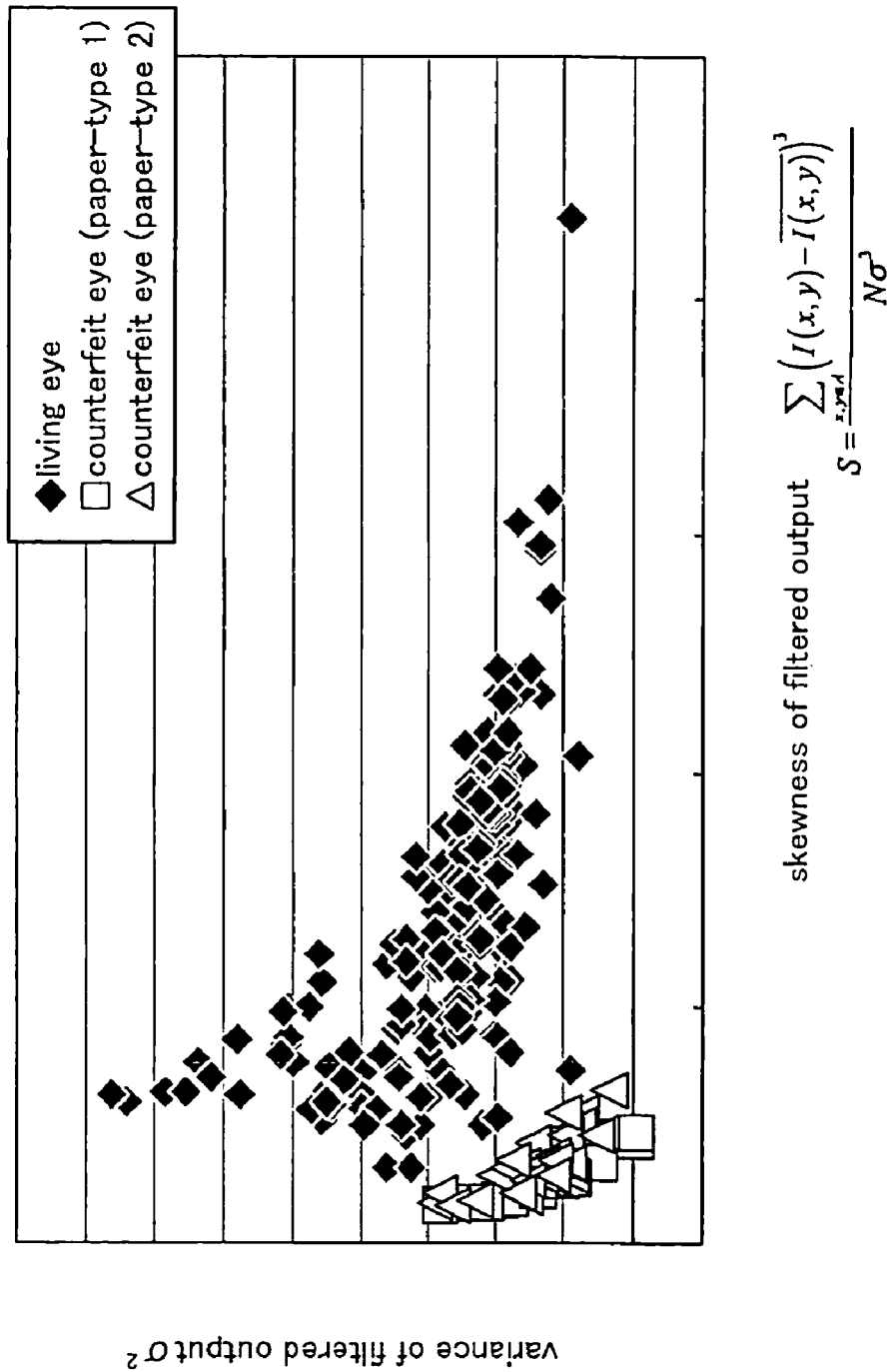

ARTIFICIAL EYE DISTINGUISHING METHOD AND DEVICE, ARTIFICIAL EYE DISTINGUISHING PROGRAM, IRIS RECOGNITION METHOD, FALSE PRINTED MATTER DISTINGUISHING METHOD, AND IMAGE DISTINGUISHING METHOD

TECHNICAL FIELD

The present invention belongs to a technology of recognizing whether an eye image proposed in iris authentication is a counterfeit (counterfeit image) or not, and relates to application of the technology.

BACKGROUND ART

As conventional counterfeit discrimination methods of an iris image, Patent Document 1 and Patent Document 2 disclose methods in which a plurality of near-infrared light sources are selectively lighted and an eye of a living body and a counterfeit eye are discriminated based on a biological reaction of the time-varying iris diameter or positional change of a bright spot caused near the iris.

(Patent Document 1) Japanese Patent No. 3312303
(Patent Document 2) Japanese Patent No. 3315648

PROBLEMS THAT THE INVENTION IS TO SOLVE

In the methods disclosed in the above Patent Documents 1 and 2, however, it is necessary to perform position detection of the pupil or the iris plural times. For this reason, a longer processing time is required and the system shall be large-scale. In view to application to small-scale systems such as mobile terminals, these problems are serious.

The present invention has been made in view of the above problems and has its object of providing a counterfeit eye discrimination method which can be realized with a simple construction.

SUMMARY OF THE INVENTION

The present invention focuses attention on roughness in an image output from a printer and implements detection of roughness in an image by image processing. Specifically, for example, band limitation is applied to image data, a predetermined feature is extracted from the band-limited image data, and then, roughness is detected based on the feature.

By this method, a counterfeit eye image projecting an eye image output from a printer and a living eye image projecting an eye of a living body can be discriminated by the image processing, thereby realizing counterfeit eye discrimination with no large-scale construction involved and with a simple construction.

Further, the present invention implements recognition as to whether a bill or valuable paper projected in an image is a counterfeit printed matter or not by utilizing the aforementioned counterfeit discrimination technique. In addition, the present invention implements recognition as to whether an image is one projecting an image of a printed matter.

According to the present invention, discrimination between a counterfeit eye image and a living eye image is enabled by the image processing, and therefore, unfair pretending using a counterfeit image can be exclude with a simple construction, which leads to great practical effects.

The present invention enables to recognize whether a bill or valuable paper projected in an image is a counterfeit printed matter or not and whether an image is one projecting a printed matter or not.

BRIEF DESCRIPTION OF DRAWINGS

FIG. 9 is a graph illustrating distributions of features of a living eye image and a counterfeit eye image, wherein variation around the center of gravity and variance are used as the features.

FIG. 10 is a graph illustrating distributions of features of a living eye image and a counterfeit eye image, wherein mean cube and the variance are used as the features.

FIG. 11 is a graph illustrating distributions of features of a living eye image and a counterfeit eye image, wherein skewness and the variance are used as the features.

BEST MODE FOR CARRYING OUT THE INVENTION

Figure 1:
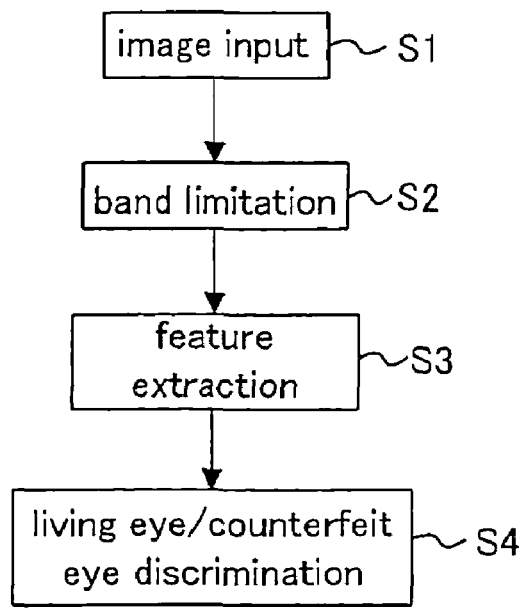
FIG. 1 is a flowchart illustrating a processing flow of a counterfeit eye discrimination method according to a first embodiment of the present invention.

The first mode of the present invention provides a counterfeit eye discrimination method, including the steps of: receiving image data of an image including an eye; and detecting presence or absence of roughness in the image by image processing to the image data, wherein the eye is judged to be a counterfeit eye when roughness is detected in the image.

The second mode of the present invention provides the counterfeit eye discrimination method of the first mode, wherein the image processing includes the steps of: performing band limitation to the image data; and extracting a predetermined feature from the band-limited image data, wherein the presence or absence of roughness is detected using the extracted feature data.

The third mode of the present invention provides the counterfeit eye discrimination method of the second mode, wherein the predetermined feature is one of or a combination of two or more of moment, central moment, skewness and kurtosis of pixel values.

The fourth mode of the present invention provides the counterfeit eye discrimination method of the second mode, wherein pixel coordinate values are used in combination with pixel values in the extraction of the predetermined feature.

The fifth mode of the present invention provides the counterfeit eye discrimination method of the second mode, wherein a center of a pupil or an iris is used in combination with pixel values in the extraction of the predetermined feature.

The sixth mode of the present invention provides the counterfeit eye discrimination method of the second mode, wherein a high-pass filter or a band-pass filter is used in the band limitation.

The seventh mode of the present invention provides the counterfeit eye discrimination method of the second mode, wherein the extraction of the predetermined feature is performed to a vicinity of an iris region or a pupil region.

The eighth mode of the present invention provides the counterfeit eye discrimination method of the second mode, wherein the extraction of the predetermined feature is performed to a region on or in a vicinity of a line passing through a center of a pupil or a center of an iris.

The ninth mode of the present invention provides the counterfeit eye discrimination method of the first mode, wherein the image processing includes the steps of: performing frequency analysis to the image data; extracting a predetermined feature from the frequency-analyzed data.

The tenth mode of the present invention provides a counterfeit eye discrimination method including the steps of: receiving image data of an image including an eye; performing band limitation to the image data; extracting a predetermined feature from the band-limited image data; and recognizing whether the eye is a counterfeit eye or a living eye based on data of the extracted feature.

The eleventh mode of the present invention provides the counterfeit eye discrimination method of the tenth mode, wherein in the recognition step, distributions of the predetermined feature of living eye images and counterfeit eye images are respectively prepared beforehand, a distance to data of the extracted feature from the feature distribution of the living eye images and a distance thereto from the feature distribution of the counterfeit eye images are calculated, and the eye is judged to be an eye belonging to the distribution, from which the calculated distance is the shorter between the living eye and the counterfeit eye.

The twelfth mode of the present invention provides a counterfeit eye discrimination device, including: an image input section that inputs image data of an image including an eye; a band limitation section that performs band limitation to the image data input in the image input section; a feature extraction section that extracts a predetermined feature from the image data processed by the band limitation section; and a recognition section that recognizes whether the eye is a counterfeit eye or a living eye based on data of the feature extracted by the feature extraction section.

The thirteenth mode of the present invention provides a program that allows a computer to execute the steps of: performing band limitation to image data of a image including an eye; extracting a predetermined feature from the band-limited image data; and recognizing whether the eye is a counterfeit eye or a living eye based on data of the extracted feature.

The fourteenth mode of the present invention provides an iris authentication method, including the steps of: performing iris authentication based on image data of an image including an eye; and performing the counterfeit eye discrimination method of claim 1 or claim 10 to the image data when a subject is authenticated as a person himself or herself in the iris authentication step.

The fifteenth mode of the present invention provides a counterfeit printed matter discrimination method, including the steps of: receiving image data of an image of a bill or valuable paper; and detecting presence or absence of roughness in the image by image processing to the image data, wherein the bill or the valuable paper is judged to be a counterfeit printed matter when roughness is detected in the image.

The sixteenth mode of the present invention provides an image discrimination method, including the steps of: receiving image data of an image; and detecting presence or absence of roughness in the image by image processing to the image data, wherein the image is judged to be an image projecting a printed matter when roughness is detected in the image.

The embodiments of the present invention will be described below with reference to drawings.

FIRST EMBODIMENT

FIG. 1 is a flowchart illustrating a processing flow of a counterfeit eye discrimination method according to the first embodiment of the present invention. In FIG. 1, image data of an image including an eye is input in Step S1 and band limitation is performed in Step S2 to the image data input in Step S1. Then, a predetermined feature is extracted in Step S3 from the image data band-limited in Step S2, and recognition as to whether an eye projected in the image is a counterfeit eye or a living eye is performed in Step S4 based on the feature extracted in Step S3.

The predetermined feature is one capable of detecting the presence of roughness in an image, and the details will be described later. When the presence of roughness in the image is detected from the data of the extracted feature, it is judged that the eye projected in the image is a counterfeit eye.

Figure 5:
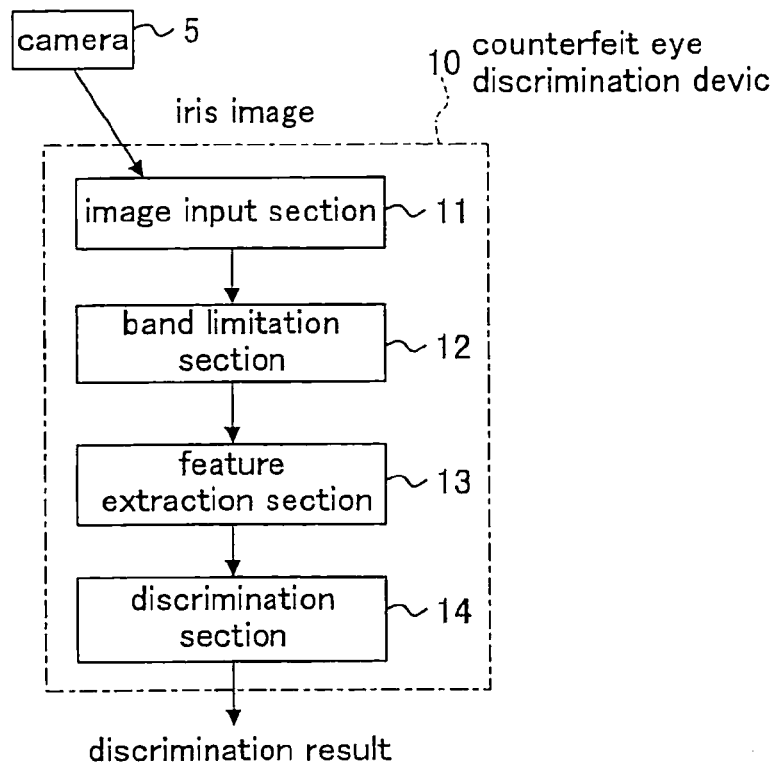
FIG. 5 is a block diagram showing a construction of a counterfeit eye discrimination device according to the first embodiment of the present invention.

FIG. 5 is a block diagram showing a construction of a counterfeit eye discrimination device according to the present invention. In FIG. 5, the counterfeit eye discrimination device 10 includes: an image input section 11 that performs Step S1; a band limitation section 12 that performs Step S2; a feature extraction section 13 that performs Step S3; and a recognition section 14 that performs Step S4. To the image input section 11, an iris image captured by, for example, a camera 5 is provided.

Figure 2:
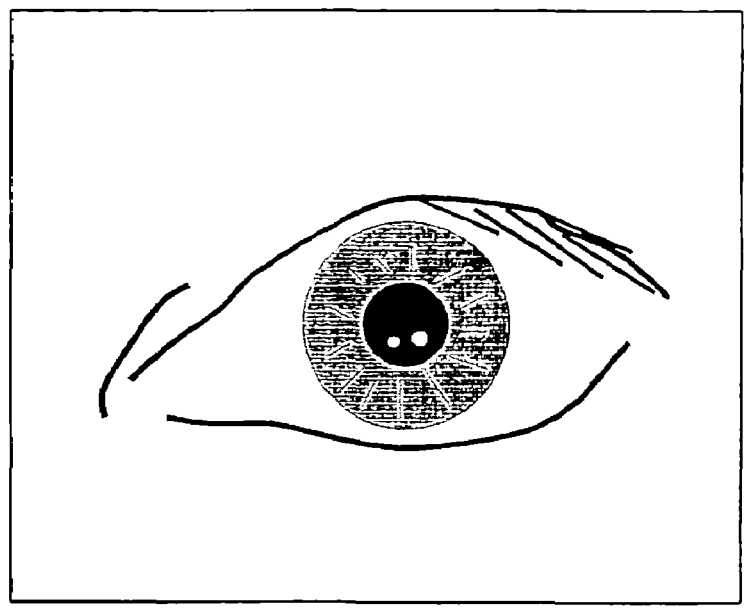
FIG. 2 is a living eye image projecting a living eye.
Figure 3:
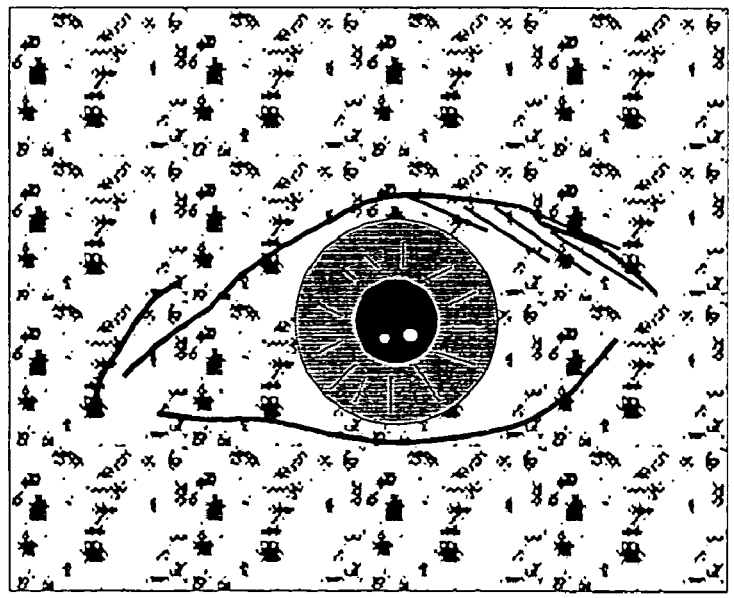
FIG. 3 is a counterfeit eye image projecting an eye image printed out on recycled paper.
Figure 4:
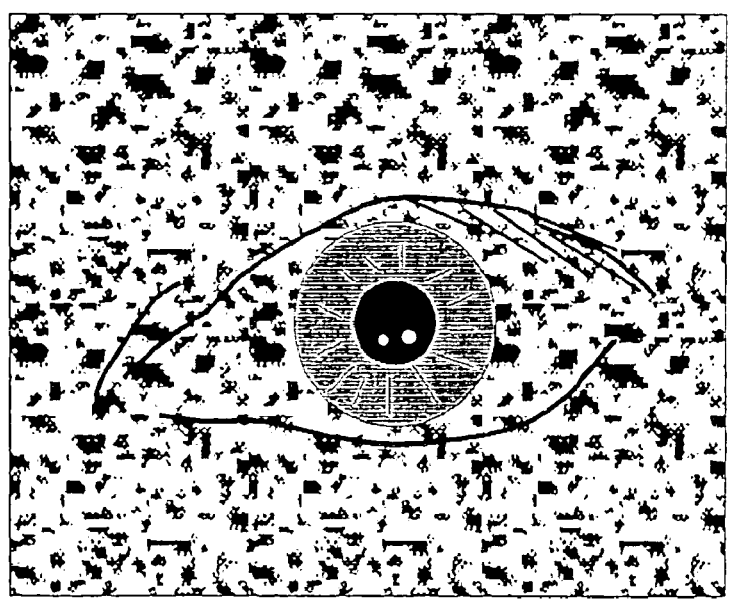
FIG. 4 is a counterfeit eye image projecting an eye image printed out on high-quality paper.

FIG. 2 is a diagram of an iris image (living eye image) captured by a camera having infrared sensitivity under near infrared illumination. Also, FIG. 3 and FIG. 4 are iris images (counterfeit eye images) obtained in such a manner that the image of FIG. 2 is output from a printer and the image of the printer output is captured again by a camera having infrared sensitivity under near infrared illumination. It is considered that in iris authentication, a malicious person may unfairly uses a printer output of an iris image (living eye image in FIG. 2) of a proper user.

Accordingly, living eye/counterfeit eye discrimination must be performed so as not to involve improper authentication for a counterfeit eye image as shown in FIG. 3 or FIG. 4.

Here, the present inventors have noticed that printer outputs as in FIG. 3 and FIG. 4 look rough and have so-called "roughness" in their images. It is inferred that the cause of the "roughness" is an ink or toner. Further, it is considered that the "roughness" is caused by repetition of a specific intensity pattern on an image, and accordingly, the present inventors have acquired knowledge that discrimination between a living eye image and a counterfeit eye image output from a printer is enabled if the presence of the "roughness" could be detected by image processing. The present invention is based on such knowledge.

The processing in each step will be described below in detail.

In Step S1, an image including an eye, more preferably an iris image is input. Image input is usually performed by a camera on the spot of recognition, but may be performed by transmitting an image captured by a camera through network. Wherein, in the case where an image captured at a time or on a spot other than those of recognition is used as an input image, it is desirable to employ combination of encryption, a password and the like as a safeguard against image data stealing.

In Step S2, band limitation is performed to the image input in Step S1 by means of a band-pass filter or a high-pass filter. As the band-pass filter, a rectangular wave filter, DOG (Difference of Gaussian) filter expressed by a difference between Gaussian filters having different characteristics, a Laplacian Gaussian filter or Gabor Wavelet may be used. Also, a known filter such as Sobel filter may be used as the high-pass filter.

Figure 8:
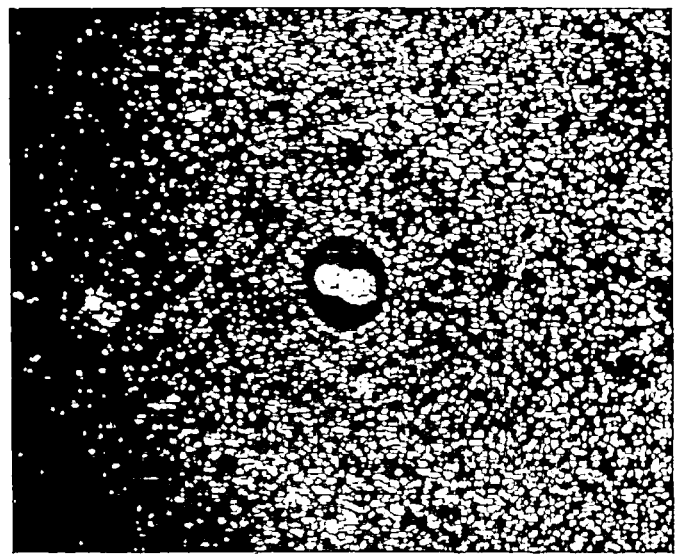
FIG. 8 shows an outcome of band limitation to the counterfeit eye image of FIG. 4.
Figure 6:
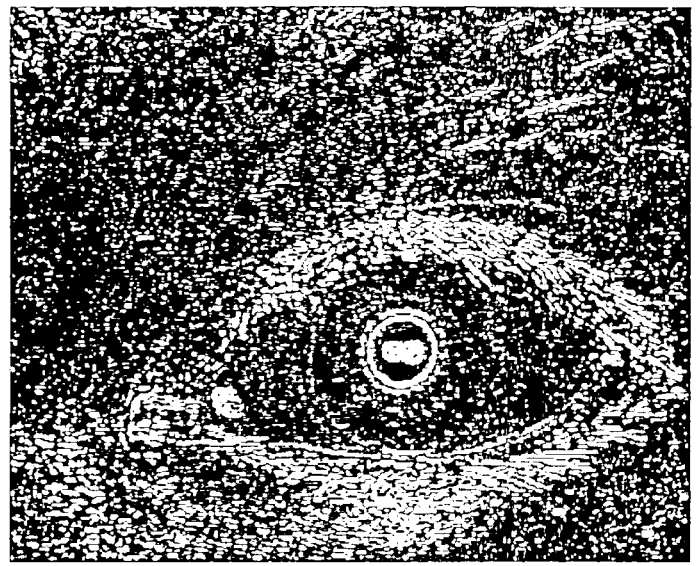
FIG. 6 shows an outcome of band limitation to the living eye image of FIG. 2.
Figure 7:
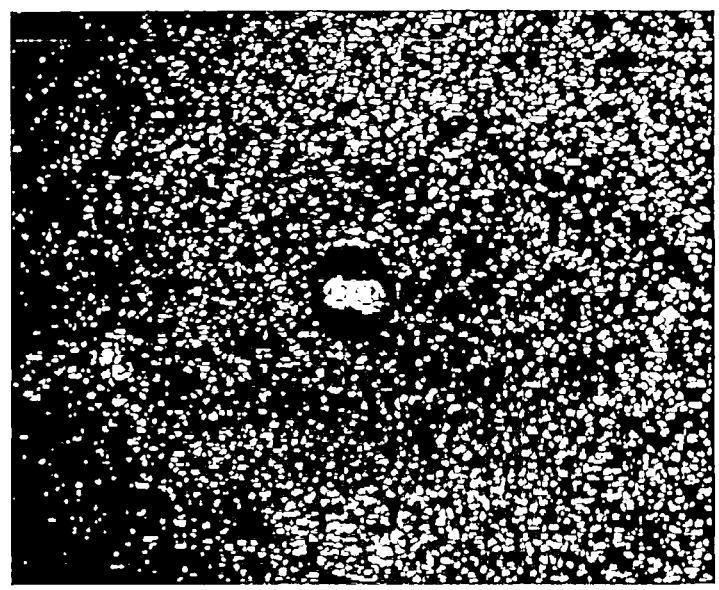
FIG. 7 shows an outcome of band limitation to the counterfeit eye image of FIG. 3.

FIG. 6, FIG. 7 and FIG. 8 are examples of band limitation using a band-pass filter to the aforementioned iris images of FIG. 2, FIG. 3 and FIG. 4, respectively. FIG. 6 through to FIG. 8 indicate that the brighter the pixels are, the larger the power is. Wherein, for the sake of easy understanding of power distribution, squared filter outputs are indicated. Comparison of FIG. 6 with FIG. 7 and FIG. 8 apparently reveals that the characteristic of FIG. 6 is greatly different from the other. In detail, in FIG. 6, which is a band-limited image of a living eye, the power is intensively increased at the pupil and in the vicinity of the eyelid, so that the contour of the eye appears. On the other hand, in each of FIG. 7 and FIG. 8, which are band-limited images of counterfeit eyes printed out from a printer, power distribution is uniformed in the region other than the pupil and the contour of the eye cannot be recognized at all. The uniform power distribution is considered to be caused due to a pattern of paper or an inherent pattern of toner.

Then, in Step S3, a predetermined feature to be used for recognition is extracted from the image band-limited in Step S2. As the feature, for example, moment such as mean square, mean cube and mean fourth power respectively expressed by Formula 1, Formula 2 and Formula 3 may be used.

$$\frac{\sum_{x,y \in A} I(x, y)^2}{N} \quad \text{(Formula 1)}$$

$$\frac{\sum_{x,y \in A} I(x, y)^3}{N} \quad \text{(Formula 2)}$$

$$\frac{\sum_{x,y \in A} I(x, y)^4}{N} \quad \text{(Formula 3)}$$

Wherein, $I(x, y)$ is a pixel value of a band-limited image, $N$ is the number of pixels from which the feature extraction is performed, and $A$ is a target region from which the feature is extracted. Also, statistics (variance $\sigma^2$ (central moment), skewness $S$, kurtosis $K$) respectively indicated by Formula 4, Formula 5 and Formula 6 may be used.

$$\sigma^2 = \frac{\sum_{x,y \in A} (I(x, y) - \overline{I(x, y)})^2}{N} \quad \text{(Formula 4)}$$

wherein, $\overline{I(x,y)}$ is an average of $I(x, y)$ $$S = \frac{\sum_{x,y \in A} (I(x, y) - \overline{I(x, y)})^3}{N \sigma^3} \quad \text{(Formula 5)}$$

$$K = \frac{\sum_{x,y \in A} I((x, y) - \overline{I(x, y)})^4}{N \sigma^4} - 3 \quad \text{(Formula 6)}$$

The above features are statistics relating to distribution of the pixel values, but the feature as in Formula 7 may be used taking in consideration of pixel coordinate values (x, y). In Formula 7, the square of the pixel coordinate values is multiplied by a square of a pixel value $I(x, y)$ for evaluating in combination the power and location of the band-limited image. Also, a feature (variation around the center of gravity) as in Formula 8, which is Formula 7 normalized by power of a band-limited image, may be used.

$$\sum_{x,y \in A} \{(x - x_g)^2 + (y - y_g)^2\} I(x, y)^2 \quad \text{(Formula 7)}$$

$$\text{herein, } x_g = \frac{\sum_{x,y \in A} x I(x, y)}{\sum_{x,y \in A} I} \text{ or } x_g = \frac{\sum_{x,y \in A} x I(x, y)^2}{\sum_{x,y \in A} I(x, y)^2}$$

$$y_g = \frac{\sum_{x,y \in A} y I(x, y)}{\sum_{x,y \in A} I} \quad y_g = \frac{\sum_{x,y \in A} y I(x, y)^2}{\sum_{x,y \in A} I(x, y)^2}$$

$$\frac{\sum_{x,y \in A} \{(x - x_g)^2 + (y - y_g)^2\} I(x, y)^2}{\sum_{x,y \in A} I(x, y)^2} \quad \text{(Formula 8)}$$

The extraction of the feature may be, of course, performed to the entirety of the image, but may be performed to pixels at intervals of several pixels, to a given region or to pixels on a given line.

Then in Step S4, recognition is performed as to whether the image input in Step S1 is a living eye image or a counterfeit eye image based on the data of the features obtained in Step S3. The recognition herein is performed as follows, for example. First, both distribution of the features extracted from a plurality of living eye images and distribution of the features extracted from a plurality of counterfeit eye images are prepared beforehand. Then, both a distance from the feature distribution of the living eye images and a distance from the feature distribution of the counterfeit eye images to data of the feature obtained in Step S3 are calculated. For the distance calculation herein, a Mahalanobis distance as indicated in Formula 9 is used, for example. Then, it is judged that the data belongs to the distribution, the calculated distance from which is the shorter, and recognition as to whether the eye projected in the image is a living eye or a counterfeit eye is performed.

$$d^2_{human\ eye} = (X - \mu_{human\ eye})^t \sum_{human\ eye}^{-1} (X - \mu_{human\ eye}) \quad \text{(Formula 9)}$$

$$d^2_{counterfeit\ eye}(X - \mu_{counterfeit\ eye})^t \sum_{counterfeit\ eye}^{-1} (X - \mu_{counterfeit\ eye})$$

Wherein, X is a feature vector extracted from an input image, $\mu$ is an average of the feature, $\Sigma$ is a covariance matrix of the feature and d is a Mahalanobis distance.

It should be noted that the living eye/counterfeit eye discrimination is not limited to a method using the Mahalanobis distance. For example, a specific recognition plane may be set or a known recognition technique such as linear discriminant analysis, support vector machine, perceptron may be employed.

Figure 12:
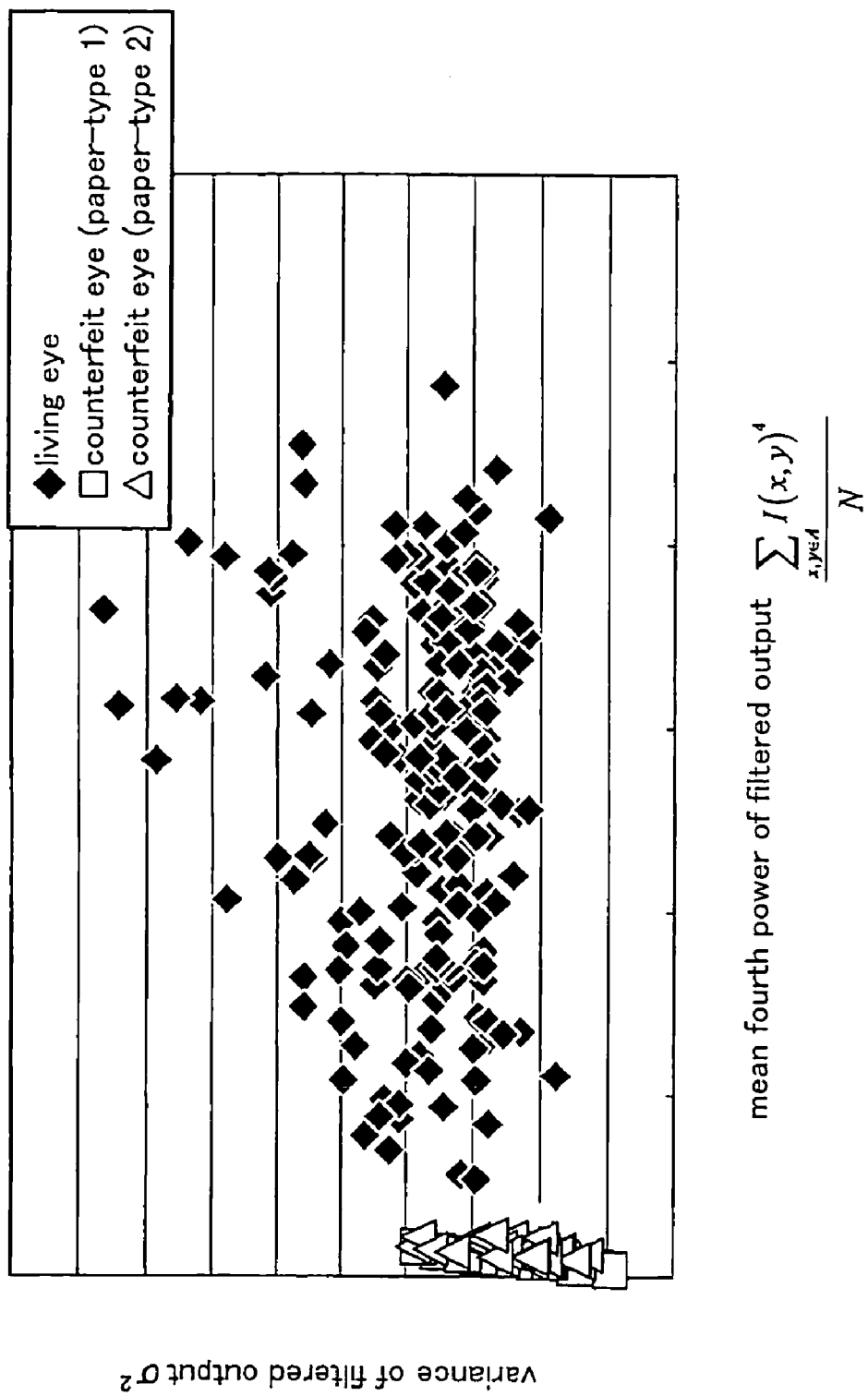
FIG. 12 is a graph illustrating distributions of features of a living eye image and a counterfeit eye image, wherein mean fourth power and the variance are used as the features.
Figure 13:
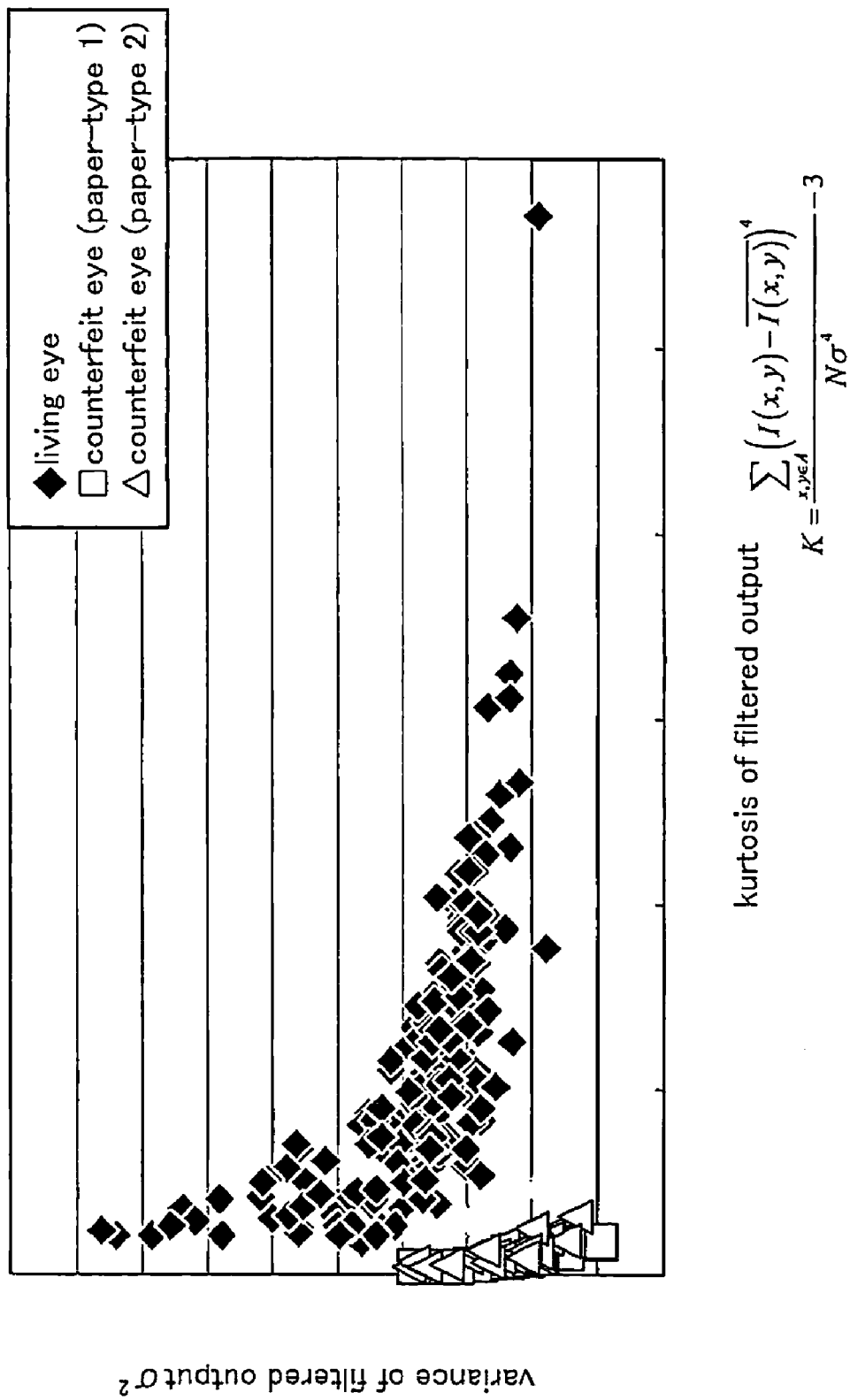
FIG. 13 is a graph illustrating distributions of features of a living eye image and a counterfeit eye image, wherein kurtosis and the variance are used as features.
Figure 14:
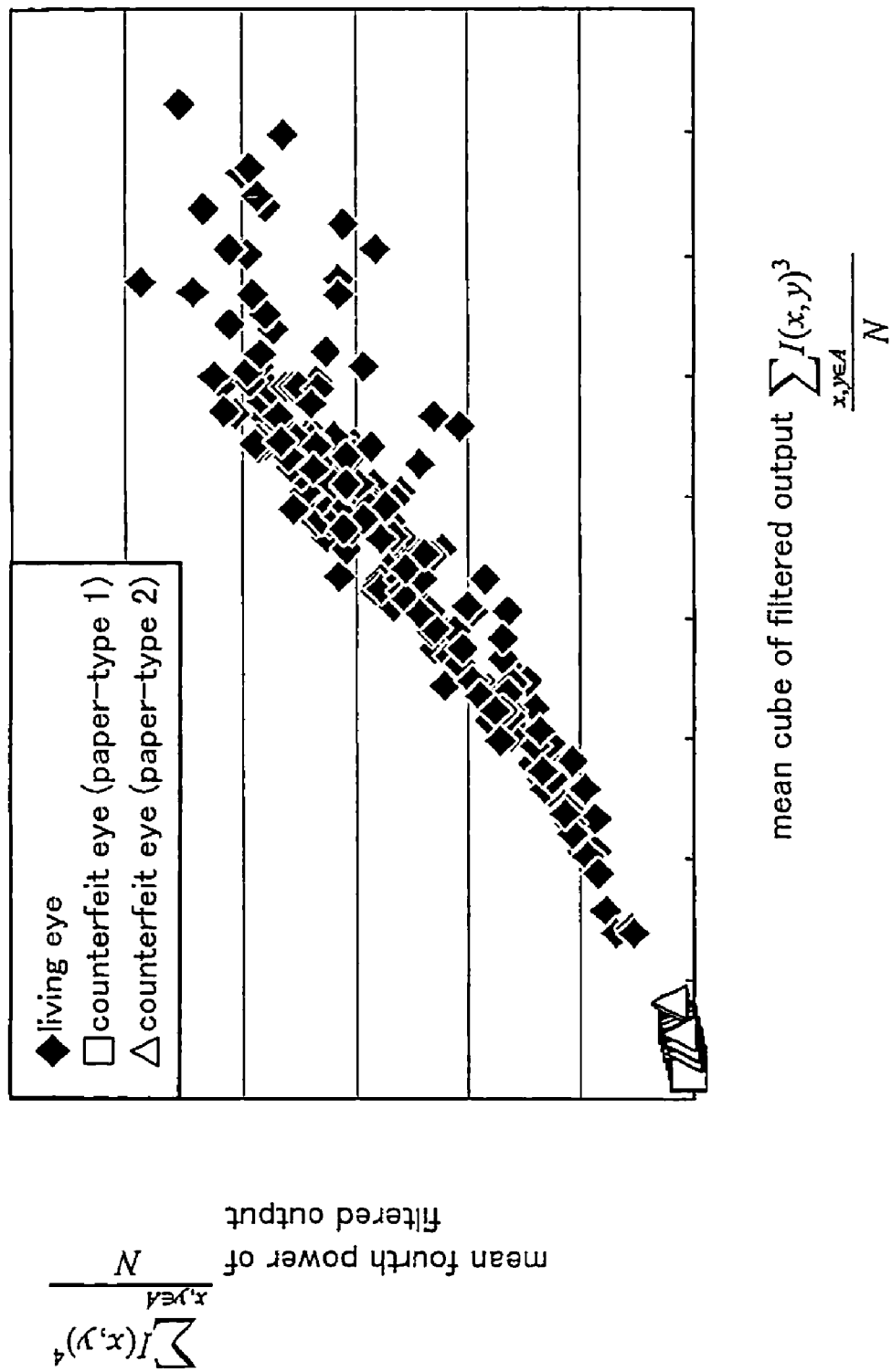
FIG. 14 is a graph illustrating distributions of features of a living eye image and a counterfeit eye image, wherein the mean cube and mean the fourth power are used as features.

FIG. 9 through to FIG. 14 are graphs illustrating distributions of the features of living eye images and counterfeit eye images. In FIG. 9, the axis of ordinates indicates the variance (Formula 4) and the axis of abscissas indicates the variation around the center of gravity (Formula 8) as the features. As well, the axis of ordinates indicates the variance and the axis of abscissas indicates the mean cube (Formula 2) in FIG. 10; the axis of ordinates indicates the variance and the axis of abscissas indicates the sckewness (Formula 3) in FIG. 11; the axis of ordinates indicates the variance and the axis of abscissas indicates the mean fourth power (Formula 3) in FIG. 12; the axis of ordinates indicates the variance and the axis of abscissas indicates the kurtosis (Formula 6) in FIG. 13; and the axis of ordinates indicates the mean fourth power and the axis of abscissas indicates the mean cube in FIG. 14. From the distributions indicated in FIG. 9 through to FIG. 14, it is understood that living eye/counterfeit eye discrimination is enabled based on a comparatively less kinds, one or two kinds, of features. Especially, as can be understood from FIG. 10 and FIG. 12, recognition with high accuracy is enabled even with employment of only the mean cube or the mean forth power.

As described above, according to the present embodiment, a living eye image projecting a living eye and a counterfeit eye image projecting an eye image printed out from a printer can be discriminated by the image processing.

It should be noted that a single filter or a plurality of filters may be used as the filter used for the band limitation. In detail, discrimination between a living eye image and a counterfeit eye image may be performed by extracting one or two or more kinds of features from outputs of a single filter or by extracting a larger number of kinds of features using a plurality of filters having different frequency characteristics, whereby the same effects as those in the present embodiment or further excellent effects can be obtained.

In addition, the roughness detection method is not limited to the method presented in the present embodiment and another method may be employed. For example, the roughness may be detected in a manner that frequency analysis of FFT (Fast Fourier Transform) or the like is performed and a predetermined feature is extracted from the analyzed frequency data. Or, it is possible that distribution of intensity frequency (intensity histogram) is obtained and the roughness is detected based on the contour of the intensity histogram.

SECOND EMBODIMENT

Figure 15:
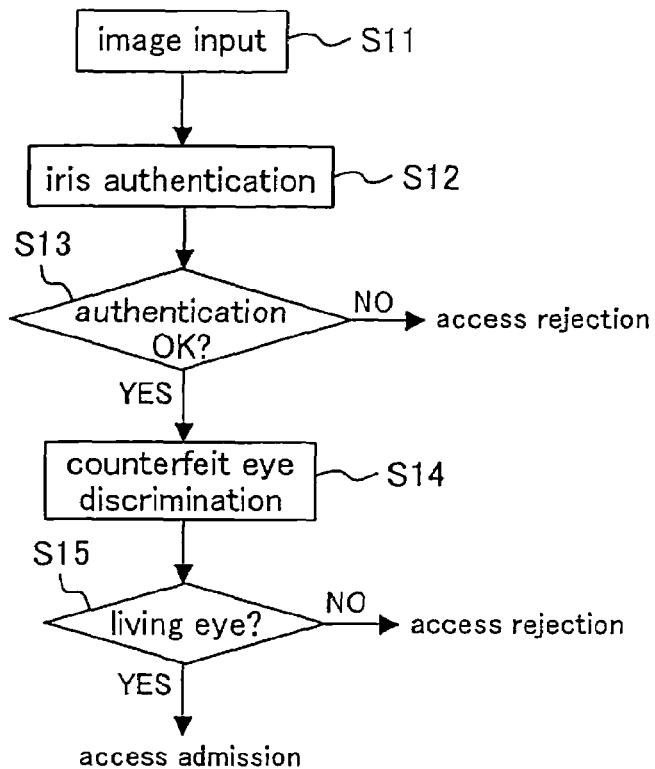
FIG. 15 is a flowchart illustrating a processing flow of an iris authentication method according to a second embodiment of the present invention.

FIG. 15 is a flowchart illustrating the processing flow of an iris authentication method according to the second embodiment of the present invention. In FIG. 15, image data of an image including an eye is input in Step S11, and iris authentication is performed in Step S12. The iris authentication herein may be performed utilizing a known method disclosed in Published Japanese Translation of PCT international publication for patent application No. 8-504979, for example, and the detailed description thereof is omitted herein. When the iris authentication by the aforementioned method results in, for example, that the input iris pattern agrees with a registered iris pattern, the authentication is judged OK (YES in S13), so that the routine proceeds to a next counterfeit eye discrimination step S14 and otherwise (NO in S13) gate passing of the person under the authentication or information access is rejected.

In Step S14, a living eye and a counterfeit eye are discriminated by the same method as presented in the first embodiment. In detail, the band limitation step S2, the feature extraction step S3 and living eye/counterfeit eye discrimination step S4 in the flowchart of FIG. 1 are performed in Step S14. Then, when it is judged a living eye in Step S14 (YES in Step S15), access is admitted. When it is judged a counterfeit eye, the access is rejected (NO in Step S15). The access rejection may be reported to a given place such as a staff room for guards, a police station or an organization.

As described above, according to the present embodiment, the processing of the counterfeit eye discrimination is combined with the iris authentication method, thereby enabling exclusion of unfair pretending using a counterfeit eye image. Further, the counterfeit eye discrimination is performed only when the judgment of the iris authentication results in OK, and this imposes no redundant counterfeit discrimination, resulting in reduction of processing amount and processing time.

Moreover, the performance of the iris authentication before the counterfeit eye discrimination enables utilization of the information on the pupil region and the iris region such as the center and diameter thereof, which has been obtained at the time of iris authentication, for counterfeit eye discrimination. For example, the center of gravity xg, yg in Formula 7 and Formula 8 may be replaced by the coordinate values of the pupil center or the coordinate values of the iris center. Whereby, the calculation amount for the counterfeit eye discrimination can be reduced.

Furthermore, it is possible to limit the region from which a predetermined feature is to be extracted in the counterfeit eye discrimination by utilizing the information on the pupil region or the iris region, which has been obtained at the time of iris authentication. For example, the target region for the feature extraction may be limited to the iris region, the vicinity of the iris region, the pupil rim or the iris rim, and still more, may be limited to a region on or in the vicinity of a line passing through the center of the pupil or the center of the iris, preferably the horizontal line or the vertical line passing therethrough. Whereby, the operation time for the counterfeit eye discrimination can be remarkably reduced.

It is, of course, possible to perform the above processing by obtaining the information on the pupil region or the iris region through the processing of the counterfeit discrimination itself.

It is noted that the counterfeit eye discrimination may be performed prior to the iris authentication, and then, the iris authentication may be performed only after the judgment of the counterfeit eye discrimination results in a living eye. In this case, the judgment as a counterfeit eye may be reported to a given organization or the like.

In addition, it is possible that while the iris authentication is performed, the counterfeit eye discrimination is performed upon detection of the pupil region or the iris region in the middle of the iris authentication.

Wherein, in the counterfeit eye discrimination according to the present invention, all or a part of the steps may be performed by exclusive hardware or through software of a program in a computer. In other words, the counterfeit eye discrimination method according to the present invention may be realized by a device including a computer that executes a program for performing the present method, or may be realized in a manner that a program for performing the present method is recorded in a computer readable recording medium and the program recorded in the recording medium is executed by a computer.

THIRD EMBODIMENT

The technique of the counterfeit eye discrimination as described above can be utilized widely in other purposes. For example, it may be utilized for recognizing whether a bill or valuable paper projected in a captured image is a genuine one, that is, an authentic one or a counterfeit printed one output from a printer.

Figure 16:
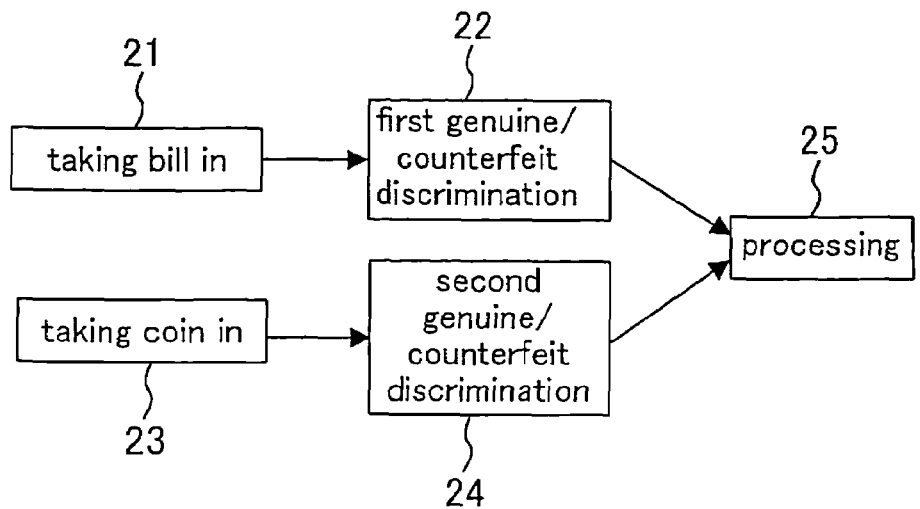
FIG. 16 is a diagram showing an example of a construction of a vending machine that performs a counterfeit printed matter discrimination method according to a third embodiment of the present invention.

FIG. 16 is a block diagram showing the schematic construction of a vending machine that performs counterfeit printed matter discrimination method according to the third embodiment of the present invention. In FIG. 16, a bill take-in section 21 takes a bill that a user puts on. A first genuine/counterfeit judging section 22 judges whether the bill caught by the bill take-in section 21 is an authentic one or not by the same processing as the counterfeit eye discrimination method described in the first embodiment. In detail, upon receipt of image data of an image of the bill, the presence of roughness in the image is detected from the image data by the image processing, and then, the bill is judged a counterfeit printed matter output from a printer when the roughness is detected from the image.

On the other hand, a coin take-in section 23 takes a coin that a user puts in. A second genuine/counterfeit judging section 24 judges whether the coin caught by the coin take-in section 23 is an authentic one or not by a known counterfeit coin discrimination method. A processing section 25 performs processing of merchandise exchange for the user according to the amount of the bill and/or the coin which are judged authentic by the first and second genuine/counterfeit judging sections 22, 24. As a result, the user receives merchandise that he/she chooses.

It is noted that it is possible to recognize whether valuable paper such as a stock, a check, in addition to a bill, is a counterfeit printed matter by the same processing as that of the counterfeit eye discrimination method described in the first embodiment.

Further, the present invention can be utilized for recognizing whether an image is one projecting a real person or the like or one projecting a printed matter output from a printer. For example, it is possible to recognize whether or not an image displayed on a monitor of an interphone is one projecting a real member of a family or a real guest by the same processing as in the counterfeit eye discrimination method described in the first embodiment. In other words, even in the case where a printed matter that is a printer output of an image projecting a member of a family or a guest is held at a monitor camera, the monitored image is easily discriminated as one projecting a printed matter by the above described processing.

It should be noted that in each of the counterfeit printed matter discrimination method and the printed matter discrimination method described herein, all or a part of the steps may be performed by exclusive hardware or may be performed through software of a program in a computer. In other words, the counterfeit printed matter discrimination method and the printed matter discrimination method according to the present invention may be realized a device including a computer that executes a program for performing the methods, and may be realized in a manner that a program for performing the method is recorded in a computer readable recording medium and the program recorded in the recording medium is executed by a computer.

INDUSTRIAL APPLICABILITY

According to the present invention, a counterfeit eye image can be discriminated by the image processing, and therefore, unfair pretending using a counterfeit eye image can be excluded by a simple construction in personal authentication using, for example an iris image.

Further, it is possible to detect a counterfeit bill and to obviate unfair trespass abusing a printed image.

The invention claimed is:

1. A counterfeit eye discrimination method comprising the steps of:
   capturing, by a capturing device, a single image from a living eye or a photocopy of a living eye that is positioned outside the capturing device;
   receiving image data of the single image and storing the image data on a memory device;
   detecting presence or absence of static textual roughness in the single image by image processing to the image data; and
   wherein the single image is judged to have been captured from a photocopy of a living eye when the static textual roughness is detected in the image,
   wherein the image processing includes the steps of:
   performing band limitation to the image data; and
   extracting a predetermined feature from the band-limited image data,
   wherein the presence or absence of the static textual roughness is detected using the extracted feature data;
   wherein the predetermined feature is one of or a combination of two or more of moment, central moment, skewness and kurtosis of pixel values.

2. The counterfeit eye discrimination method of claim 1, wherein pixel coordinate values are used in combination with pixel values in the extraction of the predetermined feature.

3. The counterfeit eye discrimination method of claim 1, wherein a center of a pupil or an iris is used in combination with pixel values in the extraction of the predetermined feature.

4. The counterfeit eye discrimination method of claim 1, wherein a high-pass filter or a band-pass filter is used in the band limitation.

5. The counterfeit eye discrimination method of claim 1, wherein the extraction of the predetermined feature is performed to a vicinity of an iris region or a pupil region.

6. The counterfeit eye discrimination method of claim 1, wherein the extraction of the predetermined feature is performed to a region on or in a vicinity of a line passing through a center of a pupil or a center of an iris.

7. The counterfeit eye discrimination method of claim 1, wherein the image processing includes the steps of:
performing frequency analysis to the image data;
extracting the predetermined feature from the frequency-analyzed data.

8. The counterfeit eye discrimination method of claim 1, further comprising performing an authentication operation in response to the judgment.

9. The counterfeit eye discrimination method of claim 1, wherein the image data of the single image include pixel values, wherein a statistical variance of the pixel values conclusively determines the static textual roughness.

10. The counterfeit eye discrimination method of claim 1, wherein the static textual roughness is on the surface of the photocopy.

11. The counterfeit eye discrimination method of claim 1, wherein the static textual roughness has characteristics indicating association with a photocopy produced by an ink or toner on a printer output.

12. The counterfeit eye discrimination method of claim 1, wherein the static textual roughness is of intensity data of the single image.

13. The counterfeit eye discrimination method of claim 1, wherein the static textual roughness has characteristics indicating association with repetition of a specific intensity pattern on a photocopy.

14. An iris authentication method comprising the steps of:
performing iris authentication based on image data of an image including an eye; and
performing the counterfeit eye discrimination method of claim 1 to the image data when a subject is authenticated as a person himself or herself in the iris authentication step.

15. A counterfeit printed matter discrimination method, characterized by comprising the steps of:
capturing a single image from a bill or valuable paper;
receiving image data of the single image and storing the image data of the single image on a memory device; and
detecting presence or absence of static textual roughness in the single image by image processing to the image data,
wherein the bill or the valuable paper is judged to be a counterfeit printed matter when roughness is detected in the image,
wherein the image processing includes the steps of:
performing band limitation to the image data; and
extracting a predetermined feature from the band-limited image data,
wherein the presence or absence of the static textual roughness is detected using the extracted feature data;
wherein the predetermined feature is one of or a combination of two or more of moment, central moment, skewness and kurtosis of pixel values.

16. An image discrimination method comprising the steps of:
capturing a single image from an object or a printed matter imitating the object;
receiving image data of the single image and storing the image data of the single image on a memory device; and
detecting presence or absence of static textual roughness in the single image by image processing to the image data,
wherein the singe image is judged to have been captured from a printed matter imitating the object when the static textual roughness is detected in the image,
wherein the image processing includes the steps of:
performing band limitation to the image data; and
extracting a predetermined feature from the band-limited image data,
wherein the presence or absence of the static textual roughness is detected using the extracted feature data;
wherein the predetermined feature is one of or a combination of two or more of moment, central moment, skewness and kurtosis of pixel values.

* * * * *

UNITED STATES PATENT AND TRADEMARK OFFICE
CERTIFICATE OF CORRECTION

| | | |
|---|---|---|
| PATENT NO. | : 7,660,443 B2 | Page 1 of 1 |
| APPLICATION NO. | : 10/529316 | |
| DATED | : February 9, 2010 | |
| INVENTOR(S) | : Takeo Azuma et al. | |

It is certified that error appears in the above-identified patent and that said Letters Patent is hereby corrected as shown below:

On the Title Page:

The first and sole Notice should read --

Subject to any disclaimer, the term of this patent is extended or adjusted under 35 U.S.C. 154(b) by 659 days.

On the title page, item (56) under Other Publications, delete "Unversity" in the second line of the first reference and insert -- University --

In column 12, line 25, claim 16, delete "singe" and insert -- single --

Signed and Sealed this

Twenty-eighth Day of September, 2010

David J. Kappos
*Director of the United States Patent and Trademark Office*